Aug. 4, 1953  P. CIBIÉ  2,648,035
COMBINED VOLTAGE REGULATOR AND SELF-CLOSING CIRCUIT BREAKER
Original Filed March 25, 1947
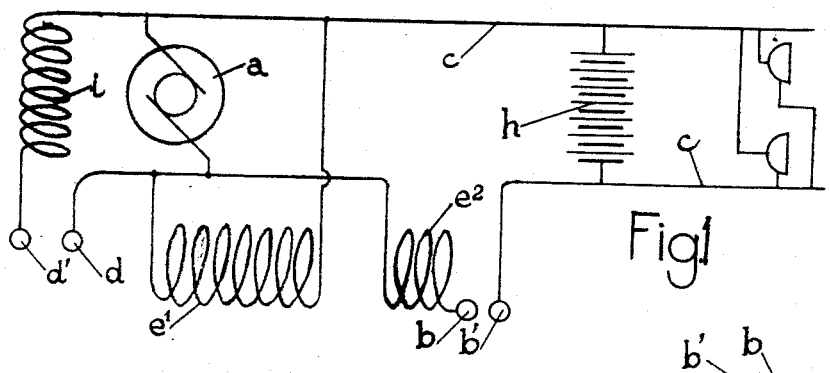
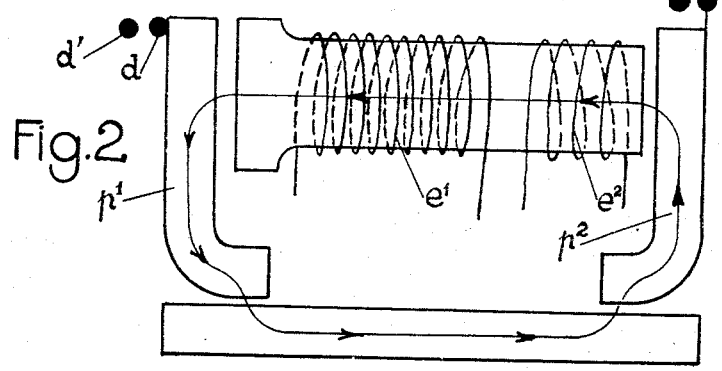
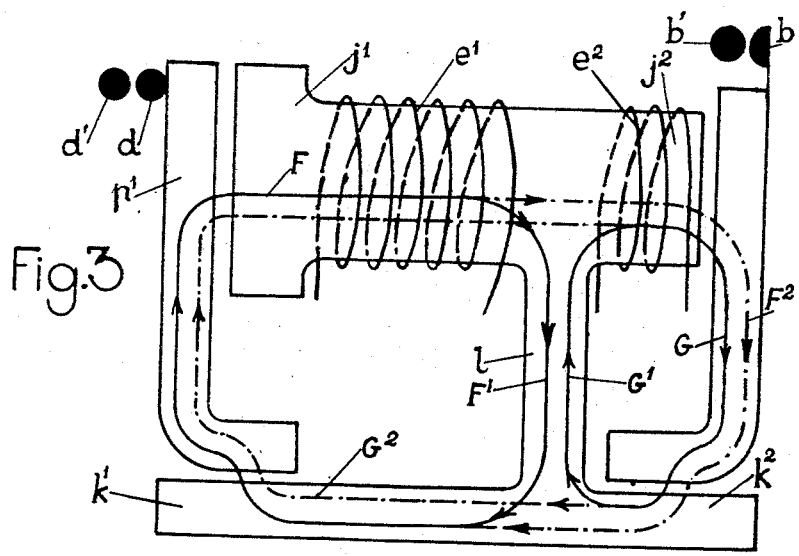

Patented Aug. 4, 1953

2,648,035

UNITED STATES PATENT OFFICE 2,648,035

COMBINED VOLTAGE REGULATOR AND SELF-CLOSING CIRCUIT BREAKER

Pierre Cibié, Paris, France

Original application March 25, 1947, Serial No. 737,165. Divided and this application July 27, 1950, Serial No. 183,561. In France March 29, 1939

Section 1, Public Law 690, August 8, 1946
Patent expires March 29, 1959

5 Claims. (Cl. 317—157)

The invention relates to apparatus combining the functions of voltage regulator and of self-closing circuit-breaker. It has for its object an improved apparatus of this kind, functioning at the same time satisfactorily as a voltage regulator and as a self-closing circuit-breaker.

According to my invention, I provide a combined voltage regulator and self-closing circuit-breaker, characterised in that the magnetic circuits of the circuit-breaker and of the voltage regulator, respectively, have a common member in which the fluxes of the respective circuits are in opposite directions, the armature of the self-closing circuit-breaker and the said common member constituting parallel paths for the flux generated by the series winding of the voltage regulator, controlling the operation of the make-and-break component of the apparatus. The neutralising winding can then be wound with a number of turns much greater than is permissible when the windings of both the voltage regulator and the self-closing circuit breaker are on the same single magnetic circuit, so that a much weaker current operates the breaking of the circuit.

Referring to the drawings left herewith:

Fig. 1 is a diagrammatic view of the connections;

Fig. 2 is a diagrammatic view of a known arrangement of voltage regulator combined with a self-closing circuit-breaker;

Fig. 3 is a diagrammatic view of the arrangement of the combined voltage regulator and self-closing circuit-breaker according to the invention.

Apparatus combining the function of a voltage regulator and of a self-closing circuit-breaker are known, of the type represented in Fig. 2 of the appended drawing and the working of which takes place according to the diagram of the Fig. 1 of the same drawing.

In a combined apparatus of this type, a winding $e^1$ creates a magneto-motive force proportional to the voltage of the generator $a$. When the speed of the generator starts from zero and increases, the voltage of the generator grows; when this voltage reaches a definite predetermined value, for example 6 volts, the armature $p^2$ is attracted and closes the distribution circuit of the generator at the contacts $bb'$. If the voltage continues to grow, the armature $p^1$ is attracted and the field winding $i$ is put in circuit at the contacts $dd'$ and the voltage is regulated according to a known procedure. If the speed of the generator drops, its voltage falls and becomes less than the predetermined value of 6 volts, but, owing to the retained magnetism of the magnetic circuits and to friction, the armature $p^2$ remains stuck. The battery of accumulators $h$ supplies then to the dynamo a current in the opposite direction flowing in the winding $e^2$ and producing a flux which annuls that of $e^1$ and overcomes the remanent magnetism; the armature $p^2$ therefore ceases to be attracted and breaks the contact $bb'$, opening in this manner the distribution circuit.

To ensure a good working of the self-closing circuit-breaker the winding $e^2$ should have a certain number of turns $n$ determined by the maximum permissible reversed current and by the construction of the regulator. In practice, it is not possible to give to this winding a sufficient value because when the regulator functions and the dynamo generates a current, the current consumed by the installation passes through the winding $e^2$. The magneto-motive force so produced adds itself to that of the winding $e^1$ and it is easily seen that the regulation of the voltage is performed at a value which is less than the predetermined one. This action is not detrimental when the winding $e^2$ is small, but it is, on the contrary, when $e^2$ is important. One is therefore obliged to use at $e^2$ a winding with a small number of turns. In these conditions, a reversed current of high intensity is needed to actuate the circuit-breaker, and the contacts $bb'$, having to cut a strong current, become rapidly worn.

The improvements object of the present invention consist essentially in modifying the shape of the magnetic circuit so that the armature $p^2$ is in parallel with the principal circuit of the voltage regulator.

The principal magnetic circuit of the regulator is constituted by the armature $p^1$, the fixed element $j^1$, $k^1$ and the leg $l$ (Fig. 3).

The principal magnetic circuit of the circuit-breaker is constituted by the armature $p^2$, the fixed elements $j^2$, $k^2$ and the leg $l$, which is common to both magnetic circuits.

The windings $e^1$ and $e^2$ are placed on the fixed elements $j^1$ and $j^2$, respectively.

The armature $p^2$ is therefore situated in the principal magnetic circuit of the self-closing circuit-breaker and in a by-pass to the magnetic circuit of the regulator.

The advantage of this arrangement is the following: the flux F produced by the winding $e^1$ divides itself into two unequal fluxes $F^1$ and $F^2$, the flux $F^2$ being weaker than $F^1$ because the reluctance of the by-pass magnetic circuit $j^2p^2k^2$ is made greater than that of the leg $l$.

In order to ensure a good working of the circuit-breaker, the winding $e^2$ must annul the flux $F^2$ at a value much smaller than in the known arrangements. Now, this winding $e^2$ produces a flux G which divides itself into two fluxes $G^1$ and $G^2$, the flux $G^2$ being weaker than $G^1$ because the reluctance of the magnetic circuit $j^1p^1k^1$ is greater than that of the leg $l$. The flux $G^2$ is the only one which interferes to modify the attraction of $p^1$, that is to say, to modify the voltage at which the regulator operates.

In these conditions, it is seen that one can give to the winding $e^2$ a value which allows the self-closing circuit-breaker to function under good conditions, that is to say with a weak reversed current, so that the contacts $bb'$ do not become deteriorated, without the voltage given by the regulator being abnormally affected by the output, since:

1. The flux acting on the self-closing circuit-breaker is only a small portion of the flux produced by the principal winding, the series winding can therefore have a smaller value than usual.

2. The voltage regulator appears as a by-pass element with respect to the magnetic circuit of the self-closing circuit-breaker and that, consequently, the flux produced by the series winding reacts very little on the regulation voltage.

As an example, on an apparatus constructed according to the present invention, one has measured the ratio $G^1/G^2=4$ for 20 amperes in the winding $e^2$ then $F^1/F^2=3.5$ for 5.5 volts in $e^1$. In these conditions, for a same action of the series winding $e^2$ on the regulation voltage, the reversed current at the moment of the opening of the circuit-breaker is $4\times3.5=14$ times weaker than with the known arrangements.

It will be understood that the arrangement which has been described and shown in the drawing is only an example of a preferred manner of carrying out the invention, and that it is susceptible of variations of construction without departing from the spirit of the invention as set forth in the following claims.

What I claim is:

1. A magnetic relay, for use in a combined voltage regulator and self-closing circuit breaker with sensitive reverse current characteristics, adapted to be connected in a circuit having a generator of varying potential and indeterminate power flow, comprising, in combination, a substantially H-shaped magnetic member having a first leg forming part of said H-shaped member and having a first end portion, an intermediate portion, and a second end portion, a second leg forming part of said H-shaped member and having a first end portion, an intermediate portion arranged oppositely to said intermediate portion of said first leg, and a second end portion, and a middle leg forming part of said H-shaped member and connecting said intermediate portions with each other; a single potential sensitive coil arranged on said first end portion of said first leg to generate magnetic flux in a given direction and adapted to be connected in shunt to the generator; and a single current coil adapted to be connected in series in the circuit and arranged on said second end portion of said first leg to generate flux in said direction when current flows through said single current coil from the generator to a load.

2. A magnetic relay, for use in a combined voltage regulator and self-closing circuit breaker with sensitive reverse current characteristics, adapted to be connected in a circuit having a generator of varying potential and indeterminate power flow, comprising, in combination, a substantially H-shaped magnetic member having a first leg forming part of said H-shaped member and having a first end portion, an intermediate portion, and a second end portion, a second leg forming part of said H-shaped member and having a first end portion, an intermediate portion arranged oppositely to said intermediate portion of said first leg, and a second end portion, and a middle leg forming part of said H-shaped member and connecting said intermediate portions with each other; a single potential sensitive coil arranged on said first end portion of said first leg to generate magnetic flux in a given direction and adapted to be connected in shunt to the generator; a single current coil adapted to be connected in series in the circuit and arranged on said second end portion of said first leg to generate flux in said direction when current flows through said single current coil from the generator to a load; a first armature arranged for cooperation with said first end portion of said first leg; and a second armature arranged for cooperation with said second end portion of said first leg.

3. A magnetic relay, for use in a combined voltage regulator and self-closing circuit breaker with sensitive reverse current characteristics, adapted to be connected in a circuit having a generator of varying potential and indeterminate power flow, comprising, in combination, a substantially H-shaped magnetic member having a first leg forming part of said H-shaped member and having a first end portion, an intermediate portion, and a second end portion, a second leg forming part of said H-shaped member and having a first end portion, an intermediate portion arranged oppositely to said intermediate portion of said first leg, and a second end portion, and a middle leg forming part of said H-shaped member and connecting said intermediate portions with each other; a single potential sensitive coil arranged on said first end portion of said first leg to generate magnetic flux in a given direction and adapted to be connected in shunt to the generator; a single current coil adapted to be connected in series in the circuit and arranged on said second end portion of said first leg to generate flux in said direction when current flows through said single current coil from the generator to a load; a first armature arranged for cooperation with said first end portion of said first leg; and a second armature arranged for cooperation with said second end portion of said first leg, the magnetic reluctance of said middle leg being appreciably smaller than the magnetic reluctance of said first end portion and said first armature and the magnetic reluctance of said second end portions and said second armature, whereby a larger part of the flux generated by said potential coil will pass through said middle leg and a smaller part through said second end portion of said first leg, said second armature, and said second end portion of said second leg, and all the flux of said current coil will pass through said second end portion of said first leg.

4. A magnetic relay for use in a combined voltage regulator and self-closing circuit breaker with sensitive reverse current characteristics, adapted to be connected in a circuit having a generator of varying potential and indeterminate power flow, comprising, in combination, a substantially H-shaped magnetic member having a first leg forming part of said H-shaped member and having a first end portion, an intermediate portion, and a second end portion, a second leg forming part of said H-shaped member and having a first end portion, an intermediate portion arranged oppositely to said intermediate portion of said first leg, and a second end portion, said first end portions being longer than said second end portions, and a middle leg forming part of said H-shaped member and connecting said intermediate portions with each other; a single potential sensitive coil arranged on said first end portion of said first leg to generate magnetic flux in a given direction and adapted to be connected in shunt to the generator; and a single current coil adapted to be connected in series in the circuit and arranged on said second end portion of said first leg to generate flux in said direction when current flows through said single current coil from the generator to a load.

5. A magnetic relay for use in a combined voltage regulator and self-closing circuit breaker with sensitive reverse current characteristics, adapted to be connected in a circuit having a generator of varying potential and indeterminate power flow, comprising, in combination, a substantially H-shaped magnetic member having a first leg forming part of said H-shaped member and having a first end portion, an intermediate portion, and a second end portion, a second leg forming part of said H-shaped member and having a first end portion, an intermediate portion arranged oppositely to said intermediate portion of said first leg, and a second end portion, and a middle leg forming part of said H-shaped member and connecting said intermediate portions with each other; a single potential sensitive coil arranged on said first end portion of said first leg to generate magnetic flux in a given direction and adapted to be connected in shunt to the generator; and a single current coil adapted to be connected in series in the circuit and arranged on said second end portion of said first leg to generate flux in said direction when current flows through said single current coil from the generator to a load, said current coil having an appreciably smaller number of turns than said potential coil.

PIERRE CIBIÉ.

References Cited in the file of this patent

UNITED STATES PATENTS

| Number | Name | Date |
| --- | --- | --- |
| 1,363,806 | Moses | Dec. 28, 1920 |
| 1,383,494 | Soreng | July 5, 1921 |
| 1,427,368 | Fortescue | Aug. 29, 1922 |
| 2,033,014 | Thompson | Mar. 3, 1936 |
| 2,307,025 | Creveling | Jan. 5, 1943 |
| 2,402,722 | Bean | June 25, 1946 |

FOREIGN PATENTS

| Number | Country | Date |
| --- | --- | --- |
| 392,193 | Great Britain | May 8, 1933 |